(12) United States Patent
DeLoach (10) Patent No.: US 7,941,355 B1
(45) Date of Patent: May 10, 2011

(54) UNIVERSAL PAYMENT PROTECTION

(75) Inventor: John Mark DeLoach, Wilmington, NC (US)

(73) Assignee: JPMorgan Chase Bank, N.A., New York, NY (US)

( * ) Notice: Subject to any disclaimer, the term of this patent is extended or adjusted under 35 U.S.C. 154(b) by 577 days.

(21) Appl. No.: 11/331,141

(22) Filed: Jan. 13, 2006

Related U.S. Application Data (60) Provisional application No. 60/684,985, filed on May 27, 2005.

(51) Int. Cl.
*G06Q 40/00* (2006.01)
(52) U.S. Cl. ........................................................ 705/35
(58) Field of Classification Search ................ 705/1–45; 283/56; 434/323; 455/412.1; 707/9; 709/206; 713/189
See application file for complete search history.

(56) References Cited

U.S. PATENT DOCUMENTS

| | | |
|---|---|---|
| 3,634,669 A | 1/1972 | Soumas et al. |
| 3,713,235 A | 1/1973 | Roberts |
| 3,946,206 A | 3/1976 | Darjany |
| 4,047,033 A | 9/1977 | Malmberg et al. |
| 4,058,220 A | 11/1977 | Torongo |
| D248,203 S | 6/1978 | Morse |
| 4,130,881 A | 12/1978 | Haessler et al. |
| 4,465,206 A | 8/1984 | Sorel et al. |
| 4,545,838 A | 10/1985 | Minkus et al. |
| 4,582,985 A | 4/1986 | Lofberg |
| 4,614,861 A | 9/1986 | Pavlov et al. |
| 4,634,845 A | 1/1987 | Riley |
| 4,643,452 A | 2/1987 | Chang et al. |
| 4,689,478 A | 8/1987 | Hale et al. |
| 4,700,055 A | 10/1987 | Kashkashian, Jr. |
| 4,746,787 A | 5/1988 | Suto et al. |
| 4,750,119 A | 6/1988 | Cohen et al. |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |

(Continued)

FOREIGN PATENT DOCUMENTS

| | | |
|---|---|---|
| CA | 2293321 | 6/1998 |

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

(Continued)

*Primary Examiner* — Mary Cheung
*Assistant Examiner* — Tien C Nguyen
(74) *Attorney, Agent, or Firm* — Hunton & Williams, LLP (57) ABSTRACT

A system for and method of providing payment protection upon the occurrence of trigger events. The system and method include an account, which may be associated with a credit card or other financial product. An accountholder may select trigger events and associated benefits. Upon the occurrence of a trigger event, the issuing entity will evaluate whether the accountholder is entitled to receive an associated benefit. Each benefit is intended to address at least one payment obligation. For example, an account may include payment protection in the form of automatic payment of minimum monthly credit card fees should the accountholder involuntarily become unemployed.

21 Claims, 3 Drawing Sheets

U.S. PATENT DOCUMENTS

| | | | |
|---|---|---|---|
| 4,831,242 A | 5/1989 | Englehardt | |
| 4,831,526 A | 5/1989 | Luchs | |
| 4,837,422 A | 6/1989 | Dethloff et al. | |
| 4,868,376 A | 9/1989 | Lessin et al. | |
| 4,870,259 A | 9/1989 | Boggan et al. | |
| 4,882,675 A | 11/1989 | Nichtberger et al. | |
| 4,897,533 A | 1/1990 | Lyszczarz | |
| D305,887 S | 2/1990 | Nishimura | |
| 4,906,826 A | 3/1990 | Spencer | |
| 4,908,521 A | 3/1990 | Boggan et al. | |
| 4,923,288 A | 5/1990 | Allen et al. | |
| 4,928,001 A | 5/1990 | Masada | |
| 4,941,090 A | 7/1990 | McCarthy | |
| 4,943,707 A | 7/1990 | Boggan | |
| 4,953,085 A * | 8/1990 | Atkins | 705/36 R |
| 4,954,985 A | 9/1990 | Yamazaki | |
| 4,961,142 A | 10/1990 | Elliott et al. | |
| 4,968,873 A | 11/1990 | Dethloff et al. | |
| 4,975,840 A | 12/1990 | DeTore et al. | |
| 4,978,401 A | 12/1990 | Bonomi | |
| 4,992,940 A | 2/1991 | Dworkin | |
| 5,025,372 A | 6/1991 | Burton et al. | |
| 5,049,728 A | 9/1991 | Rovin | |
| 5,055,662 A | 10/1991 | Hasegawa | |
| 5,080,748 A | 1/1992 | Bonomi | |
| 5,095,194 A | 3/1992 | Barbanell | |
| 5,117,355 A | 5/1992 | McCarthy | |
| 5,146,068 A | 9/1992 | Ugawa et al. | |
| 5,175,416 A | 12/1992 | Mansvelt | |
| 5,177,342 A | 1/1993 | Adams | |
| 5,180,901 A | 1/1993 | Hiramatsu | |
| 5,185,697 A | 2/1993 | Jacobs et al. | |
| 5,191,522 A | 3/1993 | Bosco et al. | |
| 5,192,947 A | 3/1993 | Neustein | |
| 5,202,286 A | 4/1993 | Nakatani | |
| 5,202,826 A | 4/1993 | McCarthy | |
| 5,206,488 A | 4/1993 | Teicher | |
| 5,206,803 A | 4/1993 | Vitagliano | |
| 5,214,700 A | 5/1993 | Pinkas et al. | |
| 5,218,631 A | 6/1993 | Katz | |
| 5,247,190 A | 9/1993 | Friend et al. | |
| 5,276,311 A | 1/1994 | Hennige | |
| 5,287,268 A | 2/1994 | McCarthy | |
| 5,287,269 A | 2/1994 | Dorrough et al. | |
| 5,297,026 A | 3/1994 | Hoffman | |
| 5,311,594 A | 5/1994 | Penzias | |
| 5,326,959 A | 7/1994 | Perazza | |
| 5,326,960 A | 7/1994 | Tannenbaum | |
| 5,328,809 A | 7/1994 | Holmes et al. | |
| 5,339,239 A | 8/1994 | Manabe et al. | |
| 5,349,633 A | 9/1994 | Katz | |
| 5,350,906 A | 9/1994 | Brody et al. | |
| 5,359,183 A | 10/1994 | Skodlar | |
| 5,361,062 A | 11/1994 | Weiss et al. | |
| 5,365,575 A | 11/1994 | Katz | |
| 5,383,113 A | 1/1995 | Knight | |
| 5,397,881 A | 3/1995 | Mannik | |
| 5,399,502 A | 3/1995 | Friend et al. | |
| 5,401,827 A | 3/1995 | Holmes et al. | |
| RE34,915 E | 4/1995 | Nichtberger et al. | |
| 5,424,524 A | 6/1995 | Ruppert et al. | |
| 5,450,477 A | 9/1995 | Amarant et al. | |
| 5,453,601 A | 9/1995 | Rosen | |
| 5,455,407 A | 10/1995 | Rosen | |
| 5,457,305 A | 10/1995 | Akel et al. | |
| 5,459,306 A | 10/1995 | Stein et al. | |
| 5,465,206 A | 11/1995 | Hilt et al. | |
| 5,466,919 A | 11/1995 | Hovakimian | |
| 5,471,669 A | 11/1995 | Lidman | |
| 5,477,038 A | 12/1995 | Levine et al. | |
| 5,477,040 A | 12/1995 | Lalonde | |
| 5,479,494 A | 12/1995 | Clitherow | |
| 5,482,139 A | 1/1996 | Rivalto | |
| 5,483,444 A | 1/1996 | Malark | |
| 5,483,445 A | 1/1996 | Pickering | |
| 5,500,514 A | 3/1996 | Veeneman et al. | |
| 5,503,891 A | 4/1996 | Marshall et al. | |
| 5,511,114 A | 4/1996 | Stimson et al. | |
| 5,512,654 A | 4/1996 | Holmes et al. | |
| 5,513,102 A | 4/1996 | Auriemma | |
| 5,521,363 A | 5/1996 | Tannenbaum | |
| 5,530,232 A | 6/1996 | Taylor | |
| 5,530,235 A | 6/1996 | Stefik et al. | |
| 5,537,314 A | 7/1996 | Kanter | |
| 5,544,086 A | 8/1996 | Davis et al. | |
| 5,544,246 A | 8/1996 | Mandelbaum et al. | |
| 5,553,120 A | 9/1996 | Katz | |
| 5,577,109 A | 11/1996 | Stimson et al. | |
| 5,578,808 A | 11/1996 | Taylor | |
| 5,581,064 A | 12/1996 | Riley et al. | |
| 5,585,787 A | 12/1996 | Wallerstein | |
| 5,590,038 A | 12/1996 | Pitroda | |
| 5,592,560 A | 1/1997 | Deaton et al. | |
| 5,604,542 A | 2/1997 | Dedrick | |
| 5,608,785 A | 3/1997 | Kasday | |
| 5,612,868 A | 3/1997 | Off | |
| 5,619,558 A | 4/1997 | Jheeta | |
| 5,621,787 A | 4/1997 | McKoy et al. | |
| 5,621,812 A | 4/1997 | Deaton et al. | |
| 5,637,845 A | 6/1997 | Kolls | |
| 5,638,457 A | 6/1997 | Deaton et al. | |
| 5,642,279 A | 6/1997 | Stone | |
| 5,642,485 A | 6/1997 | Deaton et al. | |
| 5,644,723 A | 7/1997 | Deaton et al. | |
| 5,644,727 A | 7/1997 | Atkins | |
| 5,649,114 A | 7/1997 | Deaton et al. | |
| 5,649,117 A | 7/1997 | Landry | |
| 5,649,118 A | 7/1997 | Carlisle et al. | |
| 5,653,914 A | 8/1997 | Holmes et al. | |
| 5,659,741 A | 8/1997 | Eberhardt | |
| 5,664,110 A | 9/1997 | Green et al. | |
| 5,664,157 A | 9/1997 | Takahira et al. | |
| 5,665,953 A | 9/1997 | Mazzamuto | |
| 5,672,678 A | 9/1997 | Holmes et al. | |
| 5,675,607 A | 10/1997 | Alesio et al. | |
| 5,675,662 A | 10/1997 | Deaton et al. | |
| 5,677,955 A | 10/1997 | Doggett et al. | |
| 5,684,291 A | 11/1997 | Taskett | |
| 5,687,322 A | 11/1997 | Deaton et al. | |
| 5,689,100 A | 11/1997 | Carrithers et al. | |
| 5,689,650 A | 11/1997 | McClelland et al. | |
| 5,692,132 A | 11/1997 | Hogan | |
| 5,696,907 A | 12/1997 | Tom | |
| 5,699,528 A | 12/1997 | Hogan | |
| 5,703,344 A | 12/1997 | Bezy et al. | |
| 5,704,046 A | 12/1997 | Hogan | |
| 5,705,798 A | 1/1998 | Tarbox | |
| 5,708,422 A | 1/1998 | Blonder et al. | |
| 5,710,458 A | 1/1998 | Iwasaki | |
| 5,710,886 A | 1/1998 | Christensen et al. | |
| 5,710,887 A | 1/1998 | Chelliah | |
| 5,710,889 A | 1/1998 | Clark et al. | |
| 5,715,399 A | 2/1998 | Bezos | |
| 5,717,925 A | 2/1998 | Harper et al. | |
| 5,721,768 A | 2/1998 | Stimson et al. | |
| 5,721,781 A | 2/1998 | Deo et al. | |
| 5,726,884 A | 3/1998 | Sturgeon et al. | |
| 5,727,153 A | 3/1998 | Powell | |
| 5,728,998 A | 3/1998 | Novis et al. | |
| 5,729,693 A | 3/1998 | Holda-Fleck | |
| 5,734,154 A | 3/1998 | Jachimowicz et al. | |
| 5,734,838 A | 3/1998 | Robinson | |
| 5,736,728 A | 4/1998 | Matsubara | |
| 5,737,421 A | 4/1998 | Audebert | |
| 5,740,549 A | 4/1998 | Reilly et al. | |
| 5,742,775 A | 4/1998 | King | |
| 5,745,049 A | 4/1998 | Akiyama et al. | |
| 5,745,706 A | 4/1998 | Wolfberg et al. | |
| 5,749,075 A | 5/1998 | Toader et al. | |
| 5,760,381 A | 6/1998 | Stich et al. | |
| 5,765,138 A | 6/1998 | Aycock et al. | |
| 5,765,141 A | 6/1998 | Spector | |
| 5,770,843 A | 6/1998 | Rose et al. | |
| 5,770,849 A | 6/1998 | Novis et al. | |
| 5,774,870 A | 6/1998 | Storey | |
| 5,777,305 A | 7/1998 | Smith et al. | |
| 5,777,306 A | 7/1998 | Masuda | |

| | | | | | | |
|---|---|---|---|---|---|---|
| 5,777,903 A | 7/1998 | Piosenka et al. | 5,974,399 A | 10/1999 | Giuliani et al. | |
| 5,778,067 A | 7/1998 | Jones et al. | RE36,365 E | 11/1999 | Levine et al. | |
| 5,787,156 A | 7/1998 | Katz | 5,984,180 A | 11/1999 | Albrecht | |
| 5,787,404 A | 7/1998 | Fernandez-Holman | 5,984,191 A | 11/1999 | Chapin, Jr. | |
| 5,789,733 A | 8/1998 | Jachimowicz et al. | 5,987,434 A | 11/1999 | Libman | |
| 5,790,636 A | 8/1998 | Marshall | 5,988,509 A | 11/1999 | Taskett | |
| 5,794,207 A | 8/1998 | Walker | 5,991,413 A | 11/1999 | Arditti et al. | |
| 5,798,950 A | 8/1998 | Fitzgerald | 5,991,743 A | 11/1999 | Irving et al. | |
| 5,799,087 A | 8/1998 | Rosen | 5,991,748 A | 11/1999 | Taskett | |
| 5,802,176 A | 9/1998 | Audebert | 5,991,750 A | 11/1999 | Watson | |
| 5,805,719 A | 9/1998 | Pare et al. | 5,999,596 A | 12/1999 | Walker et al. | |
| 5,806,042 A | 9/1998 | Kelly et al. | 6,000,608 A | 12/1999 | Dorf | |
| 5,806,044 A | 9/1998 | Powell | 6,000,832 A | 12/1999 | Franklin et al. | |
| 5,806,045 A | 9/1998 | Biorge | 6,002,383 A | 12/1999 | Shimada | |
| 5,807,627 A | 9/1998 | Friend et al. | 6,003,762 A | 12/1999 | Hayashida | |
| 5,809,478 A | 9/1998 | Greco | 6,004,681 A | 12/1999 | Epstein et al. | |
| 5,814,796 A | 9/1998 | Benson et al. | 6,006,988 A | 12/1999 | Behrmann et al. | |
| 5,815,657 A | 9/1998 | Williams et al. | 6,009,415 A | 12/1999 | Shurling et al. | |
| 5,815,658 A | 9/1998 | Kuriyama | 6,014,636 A | 1/2000 | Reeder | |
| 5,819,234 A | 10/1998 | Slavin et al. | 6,014,638 A | 1/2000 | Burge et al. | |
| 5,819,237 A | 10/1998 | Garman | 6,014,645 A | 1/2000 | Cunningham | |
| 5,826,243 A | 10/1998 | Musmanno et al. | 6,014,749 A | 1/2000 | Gloor et al. | |
| 5,832,457 A | 11/1998 | O'Brien | 6,016,482 A | 1/2000 | Molinari et al. | |
| 5,832,488 A | 11/1998 | Eberhardt | 6,016,954 A | 1/2000 | Abe et al. | |
| 5,835,061 A | 11/1998 | Stewart | 6,019,284 A | 2/2000 | Freeman et al. | |
| 5,835,576 A | 11/1998 | Katz | 6,021,189 A * | 2/2000 | Vu | 379/114.17 |
| 5,839,113 A | 11/1998 | Federau et al. | 6,026,370 A | 2/2000 | Jermyn | |
| 5,845,259 A | 12/1998 | West et al. | 6,029,139 A | 2/2000 | Cunningham et al. | |
| 5,845,260 A | 12/1998 | Nakano et al. | 6,029,144 A | 2/2000 | Barrett et al. | |
| 5,852,811 A | 12/1998 | Atkins | 6,029,890 A | 2/2000 | Austin | |
| 5,852,812 A | 12/1998 | Reeder | 6,032,136 A | 2/2000 | Brake, Jr. et al. | |
| 5,857,079 A | 1/1999 | Claus et al. | 6,032,859 A | 3/2000 | Muehlberger et al. | |
| 5,857,175 A | 1/1999 | Day | 6,036,099 A | 3/2000 | Leighton | |
| 5,857,709 A | 1/1999 | Chock | 6,038,292 A | 3/2000 | Thomas | |
| 5,859,419 A | 1/1999 | Wynn | 6,038,552 A | 3/2000 | Fleischl et al. | |
| 5,864,609 A | 1/1999 | Cross et al. | 6,041,315 A | 3/2000 | Pollin | |
| 5,864,828 A | 1/1999 | Atkins | 6,044,360 A | 3/2000 | Picciallo | |
| 5,864,830 A | 1/1999 | Armetta et al. | 6,045,042 A | 4/2000 | Ohno | |
| RE36,116 E | 2/1999 | McCarthy | 6,047,067 A | 4/2000 | Rosen | |
| 5,870,718 A | 2/1999 | Spector | 6,047,268 A | 4/2000 | Bartoli et al. | |
| 5,870,721 A | 2/1999 | Norris | 6,049,463 A | 4/2000 | O'Malley et al. | |
| 5,875,437 A | 2/1999 | Atkins | 6,049,773 A | 4/2000 | McCormack et al. | |
| 5,883,377 A | 3/1999 | Chapin, Jr. | 6,049,782 A | 4/2000 | Gottesman et al. | |
| 5,883,810 A | 3/1999 | Franklin et al. | 6,058,378 A | 5/2000 | Clark et al. | |
| 5,884,271 A | 3/1999 | Pitroda | 6,064,985 A | 5/2000 | Anderson | |
| 5,884,278 A | 3/1999 | Powell | 6,065,675 A | 5/2000 | Teicher | |
| 5,884,285 A | 3/1999 | Atkins | 6,068,183 A | 5/2000 | Freeman et al. | |
| 5,887,065 A | 3/1999 | Audebert | 6,070,067 A | 5/2000 | Nguyen et al. | |
| 5,890,138 A | 3/1999 | Godin et al. | 6,070,147 A | 5/2000 | Harms et al. | |
| 5,890,140 A | 3/1999 | Clark et al. | 6,070,153 A | 5/2000 | Simpson | |
| H1794 H | 4/1999 | Claus | 6,076,068 A | 6/2000 | DeLapa et al. | |
| 5,897,620 A | 4/1999 | Walker et al. | 6,076,072 A | 6/2000 | Libman | |
| 5,897,621 A | 4/1999 | Boesch et al. | 6,078,888 A | 6/2000 | Johnson, Jr. | |
| 5,905,246 A | 5/1999 | Fajkowski | 6,078,891 A | 6/2000 | Riordan et al. | |
| 5,907,350 A | 5/1999 | Nemirofsky | 6,091,817 A | 7/2000 | Bertina et al. | |
| 5,907,828 A | 5/1999 | Meyer et al. | 6,092,056 A | 7/2000 | Tull, Jr. et al. | |
| 5,911,135 A | 6/1999 | Atkins | 6,095,412 A | 8/2000 | Bertina et al. | |
| 5,911,136 A | 6/1999 | Atkins | 6,095,416 A | 8/2000 | Grant et al. | |
| 5,914,472 A | 6/1999 | Foladare et al. | 6,098,053 A | 8/2000 | Slater | |
| 5,920,629 A | 7/1999 | Rosen | 6,105,011 A | 8/2000 | Morrison, Jr. | |
| 5,920,844 A | 7/1999 | Hotta et al. | 6,105,865 A | 8/2000 | Hardesty | |
| 5,920,847 A | 7/1999 | Kolling et al. | 6,109,525 A | 8/2000 | Blomqvist et al. | |
| 5,923,734 A | 7/1999 | Taskett | 6,112,191 A | 8/2000 | Burke | |
| 5,926,800 A | 7/1999 | Baronowski et al. | 6,115,458 A | 9/2000 | Taskett | |
| 5,930,217 A | 7/1999 | Kayanuma | 6,119,097 A | 9/2000 | Ibarra | |
| 5,931,764 A | 8/1999 | Freeman et al. | 6,119,103 A | 9/2000 | Basch et al. | |
| 5,933,817 A | 8/1999 | Hucal | 6,119,107 A | 9/2000 | Polk | |
| 5,937,068 A | 8/1999 | Audebert | 6,119,932 A | 9/2000 | Maloney et al. | |
| 5,940,811 A | 8/1999 | Norris | 6,122,623 A | 9/2000 | Garman | |
| 5,946,669 A | 8/1999 | Polk | 6,128,598 A | 10/2000 | Walker et al. | |
| 5,952,641 A | 9/1999 | Korshun | 6,128,599 A | 10/2000 | Walker et al. | |
| 5,953,423 A | 9/1999 | Rosen | 6,129,274 A | 10/2000 | Suzuki | |
| 5,953,710 A | 9/1999 | Fleming | 6,129,572 A | 10/2000 | Feldman et al. | |
| 5,955,961 A | 9/1999 | Wallerstein | 6,134,309 A | 10/2000 | Carson | |
| 5,956,695 A | 9/1999 | Carrithers et al. | 6,134,536 A | 10/2000 | Shepherd | |
| 5,963,648 A | 10/1999 | Rosen | 6,138,917 A | 10/2000 | Chapin, Jr. | |
| 5,963,925 A | 10/1999 | Kolling et al. | 6,145,741 A | 11/2000 | Wisdom et al. | |
| 5,970,479 A | 10/1999 | Shepherd | 6,148,297 A | 11/2000 | Swor et al. | |
| 5,970,480 A | 10/1999 | Kalina | 6,161,096 A | 12/2000 | Bell | |

| | | |
|---|---|---|
| 6,163,770 A | 12/2000 | Gamble et al. |
| 6,164,533 A | 12/2000 | Barton |
| 6,167,385 A | 12/2000 | Hartley-Urquhart |
| 6,169,975 B1 | 1/2001 | White et al. |
| 6,173,267 B1 | 1/2001 | Cairns |
| 6,182,048 B1 | 1/2001 | Osborn et al. |
| 6,182,894 B1 | 2/2001 | Hackett et al. |
| 6,186,793 B1 | 2/2001 | Brubaker |
| 6,189,787 B1 | 2/2001 | Dorf |
| 6,192,113 B1 | 2/2001 | Lorsch |
| 6,195,644 B1 | 2/2001 | Bowie |
| 6,202,053 B1 | 3/2001 | Christiansen et al. |
| RE37,122 E | 4/2001 | Levine et al. |
| 6,213,392 B1 | 4/2001 | Zuppichich |
| 6,223,143 B1 | 4/2001 | Weinstock et al. |
| 6,227,447 B1 | 5/2001 | Campisano |
| 6,243,688 B1 | 6/2001 | Kalina |
| 6,260,758 B1 | 7/2001 | Blumberg |
| 6,263,316 B1 | 7/2001 | Khan et al. |
| 6,265,977 B1 | 7/2001 | Vega et al. |
| 6,278,981 B1 | 8/2001 | Dembo et al. |
| 6,295,344 B1 | 9/2001 | Marshall |
| 6,295,522 B1 | 9/2001 | Boesch |
| 6,298,336 B1 | 10/2001 | Davis et al. |
| 6,308,268 B1 | 10/2001 | Audebert |
| 6,315,196 B1 * | 11/2001 | Bachman ............... 235/380 |
| 6,324,524 B1 | 11/2001 | Lent et al. |
| 6,330,546 B1 | 12/2001 | Gopinathan et al. |
| 6,336,099 B1 | 1/2002 | Barnett et al. |
| 6,338,048 B1 | 1/2002 | Mori |
| 6,341,724 B2 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |
| 6,374,230 B1 | 4/2002 | Walker et al. |
| 6,377,669 B1 | 4/2002 | Walker et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| D462,477 S | 9/2002 | Osborne |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,481,125 B1 | 11/2002 | Pokrasoff |
| 6,484,144 B2 | 11/2002 | Martin et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,498,861 B1 | 12/2002 | Hamid et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,529,880 B1 | 3/2003 | McKeen et al. |
| D474,235 S | 5/2003 | Haas |
| 6,557,750 B1 | 5/2003 | Druse et al. |
| 6,557,766 B1 | 5/2003 | Leighton |
| 6,560,578 B2 | 5/2003 | Eldering |
| 6,561,657 B1 | 5/2003 | Schofield |
| 6,567,786 B1 | 5/2003 | Bibelnieks et al. |
| 6,567,821 B1 | 5/2003 | Polk |
| 6,574,603 B1 | 6/2003 | Dickson et al. |
| 6,581,839 B1 | 6/2003 | Lasch et al. |
| D476,681 S | 7/2003 | Al Amri |
| D477,359 S | 7/2003 | Haas |
| 6,601,040 B1 | 7/2003 | Kolls |
| 6,601,761 B1 | 8/2003 | Katis |
| 6,609,111 B1 | 8/2003 | Bell |
| RE38,255 E | 9/2003 | Levine et al. |
| 6,615,189 B1 * | 9/2003 | Phillips et al. ............... 705/41 |
| 6,615,190 B1 * | 9/2003 | Slater ............... 705/41 |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,693,544 B1 | 2/2004 | Hebbecker |
| 6,732,919 B2 | 5/2004 | Macklin et al. |
| 6,742,704 B2 | 6/2004 | Fitzmaurice et al. |
| 6,745,938 B2 | 6/2004 | Sullivan |
| 6,757,660 B2 | 6/2004 | Canada et al. |
| 6,757,710 B2 | 6/2004 | Reed |
| D495,736 S | 9/2004 | Scharf |
| 6,793,135 B1 | 9/2004 | Ryoo |
| 6,802,008 B1 | 10/2004 | Ikefuji et al. |
| 6,805,287 B2 | 10/2004 | Bishop |
| 6,856,973 B1 | 2/2005 | Bott |
| 6,865,547 B1 | 3/2005 | Brake, Jr. et al. |
| 6,868,426 B1 | 3/2005 | Mankoff |
| 6,876,971 B1 | 4/2005 | Burke |
| D505,450 S | 5/2005 | Lauer et al. |
| 6,895,383 B2 | 5/2005 | Heinrich |
| 6,895,386 B1 | 5/2005 | Bachman et al. |
| 6,901,372 B1 | 5/2005 | Helzerman |
| 6,912,502 B1 | 6/2005 | Buddle et al. |
| 6,970,830 B1 | 11/2005 | Samra et al. |
| 6,978,369 B2 | 12/2005 | Wheeler et al. |
| 6,999,943 B1 | 2/2006 | Johnson et al. |
| 7,006,992 B1 | 2/2006 | Packwood |
| 7,051,925 B2 | 5/2006 | Schwarz, Jr. |
| 7,062,031 B2 | 6/2006 | Becerra et al. |
| 7,072,864 B2 | 7/2006 | Brake, Jr. et al. |
| 7,072,909 B2 | 7/2006 | Polk |
| 7,089,503 B1 | 8/2006 | Bloomquist et al. |
| 7,092,905 B2 | 8/2006 | Behrenbrinker et al. |
| 7,092,916 B2 | 8/2006 | Diveley et al. |
| 7,104,443 B1 | 9/2006 | Paul et al. |
| 7,107,249 B2 | 9/2006 | Dively et al. |
| 7,113,914 B1 | 9/2006 | Spielmann et al. |
| D533,220 S | 12/2006 | Graves et al. |
| 7,165,049 B2 | 1/2007 | Slater |
| D538,349 S | 3/2007 | Hollands |
| 7,216,091 B1 | 5/2007 | Blandina et al. |
| 7,225,155 B1 | 5/2007 | Polk |
| 7,243,839 B2 | 7/2007 | Beck et al. |
| 7,249,092 B2 | 7/2007 | Dunn et al. |
| 7,252,223 B2 | 8/2007 | Schofield |
| D551,705 S | 9/2007 | Mershon |
| 7,266,524 B1 * | 9/2007 | Butcher, III ............... 705/38 |
| 7,295,999 B1 * | 11/2007 | Simon et al. ............... 705/36 R |
| 7,315,843 B2 | 1/2008 | Diveley et al. |
| 7,346,562 B2 * | 3/2008 | Inoue et al. ............... 705/27 |
| 7,346,567 B2 * | 3/2008 | Weeks ............... 705/35 |
| 7,373,304 B1 | 5/2008 | Pletz et al. |
| 7,392,222 B1 | 6/2008 | Hamilton et al. |
| 7,392,224 B1 | 6/2008 | Bauer et al. |
| 7,406,426 B1 | 7/2008 | Pletz et al. |
| 2001/0011227 A1 | 8/2001 | Ashery et al. |
| 2001/0011243 A1 | 8/2001 | Dembo et al. |
| 2001/0027389 A1 | 10/2001 | Beverina et al. |
| 2001/0027441 A1 | 10/2001 | Wankmueller |
| 2001/0034647 A1 | 10/2001 | Marks et al. |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047332 A1 | 11/2001 | Gonen-Friedman et al. |
| 2001/0047342 A1 | 11/2001 | Cuervo |
| 2001/0054003 A1 | 12/2001 | Chien et al. |
| 2001/0056398 A1 | 12/2001 | Scheirer |

| | | |
|---|---|---|
| 2002/0019793 A1 | 2/2002 | Frattalone |
| 2002/0019803 A1 | 2/2002 | Muller |
| 2002/0026418 A1 | 2/2002 | Koppel et al. |
| 2002/0032609 A1 | 3/2002 | Wilkman |
| 2002/0046089 A1 | 4/2002 | Zorn |
| 2002/0046255 A1 | 4/2002 | Moore et al. |
| 2002/0062235 A1 | 5/2002 | Wahlbin et al. |
| 2002/0065720 A1 | 5/2002 | Carswell et al. |
| 2002/0077964 A1 | 6/2002 | Brody et al. |
| 2002/0077978 A1 | 6/2002 | O'Leary et al. |
| 2002/0082990 A1 | 6/2002 | Jones |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0099586 A1 | 7/2002 | Bladen et al. |
| 2002/0104878 A1 | 8/2002 | Seifert et al. |
| 2002/0111916 A1 | 8/2002 | Coronna et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0129221 A1 | 9/2002 | Borgin et al. |
| 2002/0138409 A1* | 9/2002 | Bass ............................... 705/38 |
| 2002/0138418 A1 | 9/2002 | Zarin et al. |
| 2002/0143703 A1 | 10/2002 | Razvan et al. |
| 2002/0147662 A1 | 10/2002 | Anderson |
| 2002/0156723 A1 | 10/2002 | Lilly et al. |
| 2002/0165771 A1 | 11/2002 | Walker et al. |
| 2002/0165820 A1 | 11/2002 | Anvekar et al. |
| 2002/0169719 A1 | 11/2002 | Dively et al. |
| 2002/0174016 A1 | 11/2002 | Cuervo |
| 2002/0174018 A1 | 11/2002 | Bunger et al. |
| 2002/0178025 A1 | 11/2002 | Hansen et al. |
| 2002/0194081 A1 | 12/2002 | Perkowski |
| 2003/0004828 A1 | 1/2003 | Epstein |
| 2003/0009358 A1* | 1/2003 | Greenfeld et al. ................. 705/4 |
| 2003/0018613 A1 | 1/2003 | Oytac |
| 2003/0023549 A1 | 1/2003 | Armes et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0074290 A1* | 4/2003 | Clore ............................... 705/35 |
| 2003/0078881 A1* | 4/2003 | Elliott et al. ..................... 705/39 |
| 2003/0101119 A1 | 5/2003 | Parsons et al. |
| 2003/0105672 A1 | 6/2003 | Epstein et al. |
| 2003/0110111 A1 | 6/2003 | Nalebuff et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0204421 A1 | 10/2003 | Houle et al. |
| 2003/0216947 A1* | 11/2003 | Callen et al. ...................... 705/4 |
| 2003/0216965 A1 | 11/2003 | Libman |
| 2003/0229525 A1 | 12/2003 | Callahan et al. |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0059952 A1 | 3/2004 | Newport et al. |
| 2004/0064402 A1 | 4/2004 | Dreyer et al. |
| 2004/0093296 A1 | 5/2004 | Phelan et al. |
| 2004/0093303 A1 | 5/2004 | Picciallo |
| 2004/0098351 A1 | 5/2004 | Duke |
| 2004/0103431 A1 | 5/2004 | Davenport et al. |
| 2004/0107161 A1* | 6/2004 | Tanaka et al. ..................... 705/38 |
| 2004/0118914 A1 | 6/2004 | Smith et al. |
| 2004/0122697 A1 | 6/2004 | Becerra et al. |
| 2004/0128186 A1 | 7/2004 | Breslin et al. |
| 2004/0193539 A1 | 9/2004 | Sullivan |
| 2004/0215507 A1 | 10/2004 | Levitt et al. |
| 2004/0243498 A1 | 12/2004 | Duke |
| 2005/0021353 A1 | 1/2005 | Aviles et al. |
| 2005/0021400 A1 | 1/2005 | Postrel |
| 2005/0021457 A1 | 1/2005 | Johnson et al. |
| 2005/0027649 A1 | 2/2005 | Cech |
| 2005/0035192 A1 | 2/2005 | Bonalle et al. |
| 2005/0071230 A1 | 3/2005 | Mankoff |
| 2005/0075932 A1 | 4/2005 | Mankoff |
| 2005/0077350 A1 | 4/2005 | Courtion et al. |
| 2005/0091138 A1 | 4/2005 | Awatsu |
| 2005/0102228 A1* | 5/2005 | Srinivasan et al. ............... 705/39 |
| 2005/0108064 A1* | 5/2005 | Castleman et al. ................ 705/4 |
| 2005/0108152 A1* | 5/2005 | Tsoa-Lee et al. ............... 705/38 |
| 2005/0119979 A1 | 6/2005 | Murashita |
| 2005/0125259 A1* | 6/2005 | Annappindi ....................... 705/4 |
| 2005/0135593 A1 | 6/2005 | Becerra et al. |
| 2005/0171842 A1 | 8/2005 | Tien et al. |
| 2005/0171898 A1 | 8/2005 | Bishop et al. |
| 2005/0177508 A1* | 8/2005 | Pembroke ....................... 705/40 |
| 2005/0199705 A1 | 9/2005 | Beck et al. |
| 2005/0234771 A1 | 10/2005 | Register et al. |
| 2005/0251478 A1* | 11/2005 | Yanavi ............................. 705/40 |
| 2005/0269396 A1 | 12/2005 | Schofield |
| 2005/0289044 A1* | 12/2005 | Breslin et al. ................... 705/38 |
| 2006/0026092 A1* | 2/2006 | Klein et al. ..................... 705/38 |
| 2006/0036553 A1 | 2/2006 | Gupta et al. |
| 2006/0047573 A1 | 3/2006 | Mitchell et al. |
| 2006/0047589 A1 | 3/2006 | Grau |
| 2006/0074794 A1 | 4/2006 | Nespola |
| 2006/0085334 A1 | 4/2006 | Murphy |
| 2006/0093123 A1 | 5/2006 | Becerra et al. |
| 2006/0106696 A1 | 5/2006 | Carlson |
| 2006/0116903 A1* | 6/2006 | Becerra ............................ 705/2 |
| 2006/0122918 A1 | 6/2006 | Graboske et al. |
| 2006/0131869 A1 | 6/2006 | Brignull |
| 2006/0136231 A1 | 6/2006 | Thomas |
| 2006/0224480 A1 | 10/2006 | Bent et al. |
| 2006/0242057 A1 | 10/2006 | Velarde |
| 2008/0177659 A1 | 7/2008 | Lacey et al. |
| 2009/0048972 A1 | 2/2009 | Bierer et al. |
| 2009/0063202 A1 | 3/2009 | Becerra et al. |
| 2009/0132312 A1 | 5/2009 | Reinheimer et al. |
| 2009/0157437 A1 | 6/2009 | Becerra et al. |

FOREIGN PATENT DOCUMENTS

| | | |
|---|---|---|
| EP | 0843292 A2 | 5/1998 |
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 99/54841 | 10/1999 |
| WO | WO 01/18699 | 3/2001 |
| WO | WO 01/69347 A2 | 9/2001 |
| WO | WO 01/69347 A3 | 9/2001 |
| WO | WO 2004/027564 A2 | 4/2004 |
| WO | WO 2004/040419 | 5/2004 |
| WO | WO 2004/114641 | 12/2004 |
| WO | WO 2005/043277 A2 | 5/2005 |
| WO | WO 2009/023817 | 2/2009 |

OTHER PUBLICATIONS

Song, A Card That Asks For ID, TIme Magazine, Apr. 12, 2004, 1 page.

A Store Card Issuer Looks for Lift from Electronic Gift Certificates, Credit Card News, Feb. 1, 1995, 2 pages.

Hotchkiss, ATM's at the head of their class, Bank Marketing, vol. 29, No. 3, Mar. 1997, pp. 26-32.

Edwards, ATMs The Hot New Media Buy, ABA Banking Journal, Mar. 1999, pp. 58, 60.

Fickenscher, Amex Prepaid Offering is Latest Card for Firms Regarding Employees, American Banker, vol. 161, No. 151, Aug. 8, 1996, pp. 1-2.

Neumann, An Enhanced Neural Network Technique for Software Risk Analysis, IEEE Transactions on Software Engineering, vol. 28, No. 9, Sep. 1, 2002, pp. 904-912.

Associates First Capital Corporation, Hoover's Inc., The Industry Standard: The Newsmagazine of the Internet Economy, thestandard.net/companies/company-display, Apr. 6, 1999.

Award Card Comparison, JA7922.

Brehl, Banks issue cash-card pledge, The Toronto Star, Oct. 9, 1997, 1 page.

Blockbuster running test of a stored value card, The American Banker, Sep. 1, 1995.

Meece, Boatman's Prepaid Cards for Worker-Incentive Firm, American Banker, Jul. 2, 1996, p. 12.

Boatmen's Floats Stored Value into the Employee Incentive Waters, Debit Card News, vol. 2, Issue 2, Jul. 16, 1996, 3 pages.

CES/NaBANCO introduces stored value card technology blockbuster video is first merchant partner, Business Wire, Inc., Jan. 15, 1996.

Card Based Award Systems, JA8309.

CardEx Incentives, www.cardex.com, Apr. 6, 1999.

CardFlash, Apr. 5, 2005.

Vandenengel, Cards on the Internet: Advertising on a $3 Bill, Industry Intelligence, Feb. 1, 1995, pp. 46-48.

Kutler, Cash Card Creator Looking Beyond Mondex, Feb. 9, 1995.

Rosen, Cash Just Isn't Flexible Enough: Shops of the Future Will Only Take Cards, Daily Express, Technology Section, Feb. 10, 1995, 1 page.

Bank, Cash, Check,Charge—What's Next?, Seattle Times, Mar. 6, 1995.

Morgan et al., Categorizing Risks for Risk Ranking, vol. 20, No. 1, Jun. 22, 2005, pp. 49-58.

Common electronic purse specifications, Business Requirements, Version 6.0, Dec. 1998.

Guidotti, Comparing Environmental risks: A Consultative Approach to Setting Priorities at the Community Level, Public Health Rev 1994, vol. 22, Jun. 16, 2005, pp. 321-337.

Britt, Competing in Auto Lending, America's Community Banker, vol. 5, No. 11, Nov. 1, 1996, pp. 33-37.

Consortium created to manage common electronic purse specification, Cardtech Securtech, Chicago, www.visa.com/av/news/PRmisc051199.vhtml, May 11, 1999.

Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.

Lamond, Credit Card Transactions Real World and Online, Paying By Credit Card-Real World and Online, http://www.virtualschool.edu/mon/ElectronicProperty/klamond/credit, printed Jul. 8, 2005, 17 pages.

D.C. Area Safeway Stores Look for Increase in Sales Volume and Revenue with Cards, Card News, vol. 6, No. 25, Dec. 30, 1991, pp. 7-9.

Piskora, Debit Cards Seen Poised for New Markets, American Banker, Credit/Debit/ATMs, Mar. 7, 1995, p. 16.

E-Z Pass, Web page, http://www.ezpass.com-Disc_portNewYork.html, Nov. 12, 2001.

E-Z Pass, Web page, http\\www.ezpass.com-Disc_ny_annual.html, Nov. 12, 2001.

E-Z Pass, Web page, http:\\www.ezpass.com-frameMain.html, Nov. 12, 2001.

E-Z Pass, Web page, http:\\www.ezpass.com-whatis.html, Nov. 12, 2001.

Business Times, Electronic Purse Can Free You from ATM Drag, Business Times, www.btimes.co.za, printed Feb. 23, 2001, 1 page.

Electronic Purse, SCIA (Smart Card Industry Association), About Smart Cards, www.scia.org, printed Feb. 23, 2001, 1 page.

Sanchez-Klein, Electronic purse alliance planned, Computerworld Online News, Jul. 29, 1998, printed Feb. 23, 2001, 2 pages.

Electronic purse card to be launched tomorrow, New Straits Times, News Clippings, Sep. 18, 1999, printed Feb. 23, 2001, 3 pages.

First Data markets stored-value cards, Cards International, Jan. 30, 1996, p. 5.

First USA—Activate Today and Get One Hour Free Calling Card Calls, Call 1-800-555-2535, First USA, 6 pages.

First USA—Call 1(800)335-2453 To Receive One Free Hour of Domestic Long Distance Calling (No Strings Attached), First USA, 6 pages.

First USA Platinum Connect, First USA Bank, First USA Promotional Mailing, Oct. 1997, 6 pages.

First Union Issues Smart Cards to Fort Benning Recruits, CardFax, vol. 1999, No. 60, Mar. 26, 1999, 1 page.

Norris, First data unit develops blockbuster cash card, Omaha World Hearld Sunrise Edition, Business Section, Jan. 19, 1996, p. 16.

Frequently asked questions, ECARD, www.eregard.com, printed Sep. 23, 2001, 7 pages.

Glossman, et al., Glossman, et al., Citicorp- Company Report.

Machlis, Have it the smart way: Burger King program drives smartcard use, Computerworld, printed Feb. 23, 2001, 1 page.

Here's the calling convience you asked for: 1-800-call-ATT . . . For All Calls, AT&T, Appendix A: For Card Carriers, 1999, 7 pages.

Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.

How Is It Different?, JA8331.

Konrad, IBM Has a Bunch of Unusual Ideas in 2003, www.philly.com, printed Jan. 21, 2004, posted on Jan. 13, 2004, 2 pages.

Incenticard, Bellsouth, JA8329.

Incentive Firms Find Debit Cards A Rewarding Experience (Off-line debit card issuers converge efforts with companies looking for effective incentives to boost employee productivity and to motivate individuals to buy their products), Debit Card News, Vol.

Coulton, Incentives Field Moving to Card-Based Series 14, American Banker, Mar. 26, 1998, 3 pages.

Introducing SpendingMoney(TM), Armetta: Marketing & Design Product Concept Report, Oct. 9, 1996, 15 pages.

Introducing the First USA Platinum Connect Card, First USA Promotional Mailing, Dec. 1997, 2 pages.

Key Bank Holiday Offer, http://www.key.com/swiftgift/home.html, printed Apr. 5, 1999.

MailFrontier Survey Finds that Consumers Hold Financial Institutions Accountable for Online Identity Theft, www.mailfrontier.com, Palo Alto, CA, Nov. 2004.

O'Connor, Maritz Gets MasterCard's Stamp of Approval, Business Travel News, Aug. 19, 1996, 2 pages.

Meridian Award Cards, JA8251.

Meridan Interoffice Memo, MeridiCard Enhancement-Floating Credit Limit, JA8354-JA8355, Aug. 2, 1989.

Meridian-the leader in card marketing, JA8343.

*Meridicard* vs. *Debit Cards*, JA7917.

Clark, Mircosoft, Visa to Jointly Develop PC Electronic-Shopping Software, The Wall Street Journal, Nov. 9, 1994, WSJ B9.

More Retailers Turn to Co-Branding, Chain Store Age Executive with Shopping Center Age, Feb. 1, 1995, 3 pages.

Bogle, Mutual Funds at the Millennium: Fund Directors and Fund Myths, The Vanguard Group to the '40 Act Institute of PLI (Practicing Law Institute), New York, NY, May 15, 2000, 15 pages.

New 1-800-CALL-ATT Campaign Promotes One Number for All Calls, AT&T Marketing, News Release, www.att.com/press/0297/970217.csa.htm, Feb. 17, 1997, 2 pages.

Schwab,Charles, Now 7 Ways For A better Total Return For Your Money; Schwat 1, The Inventor's Asset Management Account, Charles R. Schwab, Charles Schwab & Co., Inc., 16 pages.

Dugas, Payroll May Ask: Paper of Plastic?, USA Today, 3B, Aug. 14, 2001, 1 page.

Proton world and Europay to co-operate in creation of new CEPS-compliant e-purse application, Press Release 1999, Waterloo, Belgium, Jun. 28, 1999, 2 pages.

Brown et al., Purchasing Card Magic: Eli Lilly Finds Accounts Payable Flying High With Plastic, Corporate Cashflow, vol. 15, No. 12, Nov. 1994, 2 pages.

Purse Application for Cross Border Use in Euro, Cordis, Pace 1st 1999-11531 Pace, www.cordis.lu, printed Feb. 23, 2001, 3 pages.

SK100 Smart Card Electronic Purse Balance Reader, SK100 Balance Reader, http://perso.wanadoo.fr, printed Feb. 23, 2001, 1 page.

Miller, Section E.2.1: Kerberos Authentication and Authorization System, Project Athena, Cambridge, MA, Dec. 21, 1987, 39 pages.

Souccar, Smart Cards: 1st Union Smard Card Pilot Enlists a Second Army Base, American Banker, Digital Frontiers, vol. 164, No. 61, Mar. 31, 1999, 3 pages.

Smart Cards: Big Brother's Little Helpers, The Privacy Committee of New South Wales, No. 66, Aug. 1995.

Smart card for loyalty and e-purse applications eclipses capability of conventional mag-stripe cards, Press Release, www.1.sib.com, Apr. 21, 1997, printed Feb. 23, 2001, 3 pages.

SmartAxis: Load Cash on to your E-Purse Card, Supported Currencies and Schemes, www.smartaxis.co.uk, printed Feb. 23, 2001, 9 pages.

Spurgin, Sopininmon! or What's Happening in the Retail Credit Card Environment, Credit World Journal, vol. 85, No. 4, Mar. 1, 1997, pp. 20-23.

Lacker, Stored Value Cards: Costly Private Substitutions for Government Currency, Economic Quarterly, 1996, Economic Quarterly, v82, n3, p1(25), ISSN: 1069-7225, 17 pages.

Lazarony, Stuck for a gift? Give a prepaid credit card, www.bankrate.com, Dec. 21, 1998, 1 page.

Key, Swift Gift 'Wows' Internet Shoppers, PR Newswire, www.key.com/swiftgift/home.html, Dec. 2, 1998, 1 page.

The Campus Card Conundrum, Card Technology, Journal ISSN: 1093-1279, p. 25+, Feb. 1998, pp. 1-8.

The Electronic Purse Reaches the Car Park, http:\\docs.vircom.net/mobility/parking, printed Feb. 23, 2001, 2 pages.

The Evolution of a New Consumerism, Chain Store Age, vol. 73, Jun. 1997, pp. 8-9.

Stoughton, The Gift of Credit, www.washingtonpost.com/wp-srv/business, Dec. 14, 1998.

Stuber, The electronic purse: An overview of recent development and issues, Bank of Canada, Technical Report No. 74, www.bankofcanada.ca, Jan. 1996, printed Feb. 23, 2001, 2 pages.

Understanding the benefits: Smartcity offers a number of important benefits to both the card issuers and their customers, http://www.icl.com/smartcards/benefits.htm, printed Feb. 27, 2001, 2 pages.

Langheinrich et al., Unintrusive Customization Techniques for Web Advertising, Computer Networks, vol. 31, 1999, pp. 1259-1272.

Universal Card free lifetime membership extended 3 months, AT&T Marketing, www.att.com/press/0297/970217.csa.html, Dec. 4, 1990, 2 pages.

Visa Cash—Where can I get it?, www.visa-asia.com/pd/cash/where.html, Feb. 23, 2001.

Visa Cash, www.visa-asia.com/pd/cash/main.html, Feb. 23, 2001.

Visa International And SERMEPA Announce Plans For Cross Border Visa Cash Based on CEPS, www.visa.com/av/news/praaamisc111699.vhtml, Nov. 16, 1999.

Visa first to launch electornic purse load via GSM mobile phone, www.cellular.co.za, Johannesburg, ZA, printed Feb. 23, 2001, 4 pages.

Visa releases visa cash electronic purse specifications based on CEPS, www.visa.com/av/news/PRaamisc042099.vhtml, San Francisco, Apr. 20, 1999.

Hansell, Visa to unveil electronic purse cards, New York Times, printed Feb. 23, 2001, 2 pages.

Welcome To Card Express CardEx website archived by web.archive on Oct. 31, 1996, http://web.archive.org/web/*/http://www.cardex.com, retrieve Oct. 18, 2003, 7 pages.

Welcome To Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.

Swiftgift, Welcome to Swiftgift, www.swiftgiftcard.com, Dec. 8, 1998, 10 pages.

Machlis et al., Will Smart cards replace ATMS?, Computerworld, printed Feb. 23, 2001, 3 pages.

Claessens, et al., A Tangled World Wide Web of Security Issues, First Monday, retrieved from the internet at http://www.firstmonday.org/issues/issue7_3/claesens, retrieved from the internet on Oct. 6, 2006.

American Express Incentive Services, Incentive, Sep. 1996, p. 126.

Hight, Jim, Consulting Services, www.strategies-tactics.com.

Nora Wood, Corporate Spotlight, Incentive, Dec. 1997, 4 pages.

Definition of Store-Value Card, Wikipedia, retrieved from the internet at http://en.wikipedia.org/wiki/Stored-value_card, retrieved from the internet on Apr. 16, 2007.

Eight Keys to Making the Right Choice, Incentive, Dec. 1996, 9 pages.

D. O'Mahony, Electronic Payment System, 1997, Artech House, XP002137255, p. 7-11.

Exclusively Yours From Maritz . . . The MasterCard Card Ultimate Incentive, Incentive, Oct. 1995, 3 pages.

Block, First Data Subsidiary Creates Payroll Card for the Bankless, LexisNexis Academic, Credit/Debit/ATMs, p. 10, Mar. 21, 1997.

Hamey, Kenneth, Home Asset Management Accounts Link Mortgages Equity Lines.

Judy Quinn, Incentive Cards Explained, Incentive, Dec. 1995, 5 pages.

Vincent Alonzo, Incentive Marketing . . . Three If By Smart Card, Incentive Sep. 1995, p. 11.

Incentive gift Card: Another way to give of choice!, Incentive, Aug. 1995, 2 pages.

LexisNexis Academic, Debit Card Innovation, vol. XXXV, No. 5, p. 2, May 1997.

LexisNexis Academic, Debit Cards: Payroll Card Ups Fees, Future Banker, p. 18, Oct. 6, 1997.

LexisNexis Academic, NTS' TransPay Debit Card Helps Remote and Unbanked Employees Get Funds Quicker, Financial News, Mar. 18, 1997.

O'Conner, Maritz Gets MasterCard's Stamp of Approval, Business Travel News, Aug. 19, 1996, 2 pages.

Maritz, Incentive, Jun. 1996, p. 111.

Meridan Award Cards, JA8251.

Allen et al., Overview of Smart Cards and the Industry, Smart Cards: Seizing Strategic Business Opportunities, Chapter 1, p. 2-20, Irwin Professional Publishing, 1997.

Paper or Plastic? With these three incentives, The Choice if Yours, Incentive, Feb. 1996, 2 pages.

Rossman, Kenneth, Summary Appraisal of Real Property.

The Evolution of a New Consumerism, Chain Store Age, vol. 73, Jun. 1997, pp. 8-9.

The Federal Transit Administration, TCRP Report 32 Multipurpose Transit Payment Media, Chapter 2 Multipurpose Fare Payment: Overview, p. 10-20.

Nora Wood, The Power of the Card, Incentive, Jul. 1997, 6 pages.

Welcome to Card Express CardEx, CardEx website archived by web.archive on Oct. 31, 1996, http://web.archive.org/web/*/http://www.cardex.com, retrieved Oct. 18, 2003, 7 pages.

Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.

Wells Fargo Blazes New Trail for Homeowners.

Kenneth Hein, What's the Deal?, Incentive, Jul. 1998, 7 pages.

* cited by examiner

UNIVERSAL PAYMENT PROTECTION

FIELD OF THE INVENTION

The present invention generally relates to a system for and method of protecting entities with financial obligations. More particularly, the invention relates to a single account equipped with the ability to handle multiple financial obligations when certain trigger events occur.

DESCRIPTION OF RELATED ART

The present application incorporates by reference in their entireties the following patents and pending patent applications: U.S. Pat. No. 6,615,190 to Slater entitled "Sponsor-Funded Stored Value Card", Pending U.S. patent application Ser. No. 10/268,763 to Slater entitled "Sponsor Funded Stored Value Card", U.S. Pat. No. 6,615,189 to Phillips et al. entitled "Debit Purchasing Of Stored Value Card For Use By And/Or Delivery To Others", U.S. patent application Ser. No. 10/681,148 to Ilijasic et al. entitled "System and Method for Insuring Financial Accounts", and U.S. patent application Ser. No. 10/681,148 to Ilijasic et al. entitled "System And Method For Insuring Financial Accounts".

SUMMARY OF THE INVENTION

According to an embodiment of the present invention, a system for and method of relieving an entity (e.g., an individual, a family, a business) from at least one payment obligation are disclosed. The embodiment includes receiving information relating to the entity and deciding whether to issue an account to the entity. The embodiment also includes issuing an account to the entity in response to the step of deciding. The embodiment further includes receiving data, the data being associated with at least one of the entity and the account. The data include: first information reflecting a trigger circumstance, the first information defining a potential future situation, and second information reflecting a benefit, the benefit being intended to address at least one payment obligation, where the payment obligation is not initially associated with the account. The embodiment further includes processing at least a portion of the data using at least one probabilistic computation, the probabilistic computation including at least one financial assessment associated with the trigger circumstance. The embodiment further includes receiving an indication that a trigger circumstance has occurred. The embodiment further includes comparing information in the indication to account information associated with the entity. The embodiment further includes determining, based on the account information associated with the entity and consistent with the data received from the entity, that the entity is entitled to the benefit. The embodiment further includes providing the benefit to the entity in accordance with the account information associated with the entity.

Various optional features of the above embodiment include the following. The embodiment may include a line of credit as the benefit. The line of credit may be intended to address any payment obligation. The line of credit may be restricted. The embodiment may include restricting who may receive funds from the line of credit. The line of credit may be intended for use against a financial obligation arising from a financial product. The method may include disposing of the benefit. The disposing may include debt deferment, debt suspension, debt cancellation, or debt forgiveness. The trigger event may be a loss of employment, divorce, disability, hospitalization, medical treatment, family leave, judicial proceedings, tax events, natural disasters, call to duty, fire, flood, marriage, child birth, child adoption, retirement, or death. The payment obligation may be a loan (e.g., mortgage), bill (e.g., health insurance bill, life insurance bill, rent, utility bill, hospital bill, credit card bill, car insurance bill), car payment (e.g., payment on a car loan or lease), retirement savings, penalty, fine, attorney fees, tax, other type of lease, line of credit, letter of credit payment, or child support. The embodiment may include a financial product such as a credit card, a stored value card, a demand deposit account, a letter of credit, or a line of credit. The embodiment may include a web page accessible by the entity, where the step of receiving data selected by the entity occurs via the website. The embodiment may include conveying to the entity, via the website, information reflecting at least one fee received from the entity. The embodiment may further comprise receiving an application from the entity, the application including the information relating to the entity, and accepting the application. The embodiment may further include receiving consideration. The consideration may include at least one fee received from the entity, at least a portion of the fee being associated with the benefit. The portion of the at least one fee associated with the benefit may include a flat fee, a lump sum fee, a percentage of a periodic obligation, a percentage of an outstanding debt, or a percentage of an average monthly balance. The consideration may include the entity obtaining an account. No compensation may be received in response to the step of issuing.

The embodiment may include receiving data selected by the entity. Such data, being associated with the account, may include third information reflecting a second trigger circumstance, the third information defining a potential future situation, and fourth information reflecting a second benefit, the second benefit being intended to address at least one payment obligation. Such an embodiment may further include receiving a request, the request indicating that a trigger circumstance has occurred, and comparing information in the request to account information associated with the entity. Such an embodiment may further include determining, based on the account information associated with the entity and consistent with the data received from the entity, that the entity is entitled to a triggered benefit, the triggered benefit being the benefit or the second benefit, and providing the triggered benefit to the entity in accordance with the account information associated with the entity.

BRIEF DESCRIPTION OF THE DRAWINGS

The invention, both as to its structure and operation together with the additional objects and advantages thereof are best understood through the following description of exemplary embodiments of the present invention when read in conjunction with the accompanying drawings.

DETAILED DESCRIPTION OF THE PREFERRED EMBODIMENTS

According to an embodiment of the present invention a universal clearinghouse account for payment protection is disclosed. The account is "universal" in the sense that it may be used to protect payment in any of a number of obligations, not limited to debts or obligations associated with the bank that issues the account. Thus, for example, the account may be used to defer a minimum monthly payment on a credit card that is not associated with the account. Such a deferral may be accomplished by issuing a line of credit to the accountholder, where the line of credit may only be used to pay minimum monthly payments on a particular credit card not associated with the account. Obligations (not limited to debts) that may be covered by the invention include, by way of non-limiting example: mortgage payments, secured and unsecured loans and lines of credit (e.g., business or consumer loans), education, credit cards (even credit cards not directly associated with the account or with the financial entity), vehicle payments (e.g., vehicle loans and vehicle leases), vehicle insurance, rent, lease, utilities (e.g., electricity, water, gas), retirement savings (e.g., 401k), penalties, fines, attorney fees, taxes, child support payments, hospital services, and any combination thereof. Any of these payments may be protected even if not initially associated with the account or financial institution. The account may include a credit card or line of credit, but is not limited to accounts that include such products.

According to certain embodiments of the present invention, a single account may provide payment protection for a plurality of financial obligations. Moreover, such embodiments may provide payment protection for obligations that are not initially associated with the account. By way of non-limiting example, certain embodiments of the present invention may include an account with a first bank that provides protection for: the minimum monthly payment on a credit card associated with a second bank, a mortgage payment where the mortgage is held by a third bank, a monthly payment into a 401K savings plan associated with a fourth bank, a car loan payment where the car loan is held by a fifth bank, and so on. In short, certain embodiments of the present invention may provide payment protection for any financial obligation whatsoever, regardless as to whether such obligation is associated with the account that provides the protection.

Figure 1:
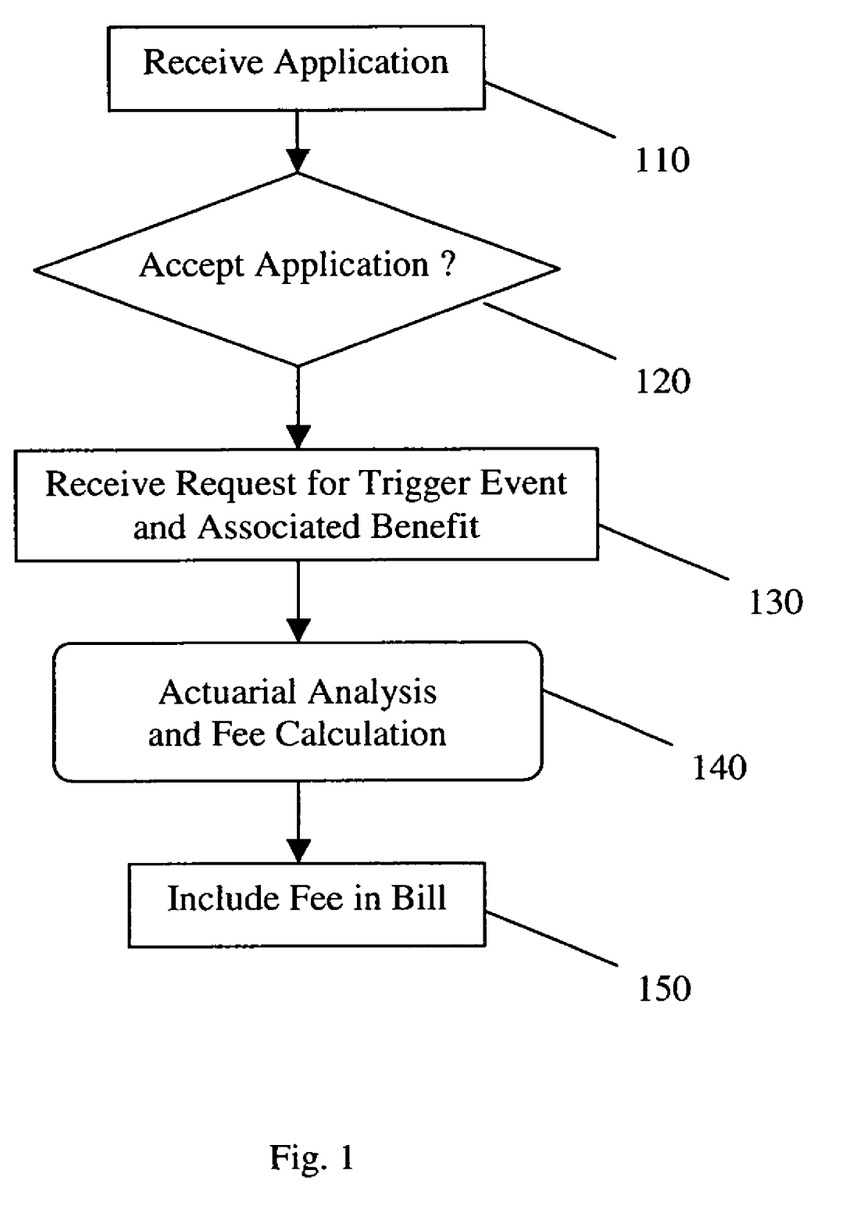
FIG. 1 is a flowchart illustrating account signup according to an embodiment of the present invention.

FIG. 1 is a flowchart illustrating account signup according to an embodiment of the present invention. Account signup may be accomplished by a variety of techniques. The first step 110 is for an entity to submit an application to the issuing bank. Although the term "issuing bank" is used herein, the entity that issues accounts in accordance with embodiments of the present invention is not limited to banks. By way of non-limiting example, banks, credit unions, savings institutions, finance companies, risk pools, or savings & loans may issue such accounts. Thus, the term "issuing bank" is meant to encompass any issuing entity. Further, the term "entity" as used herein, is meant to encompass, by way of non-limiting example, a consumer, a corporation, or a family.

Note that embodiments of the present invention are not limited to submission of the application by the entity. For example, in certain embodiments of the present invention, the application may be submitted by a third-party, such as, by way of non-limiting example, a mortgage holder.

The account associated with an embodiment of the present invention may be a pre-existing account, in which case an application will already be on record. For example, the account may be associated with a mortgage, loan, or other pre-existing financial product associated with the entity. Alternately, an entity may apply for an account by telephone, in person, mail, email or internet. An entity may first be offered an opportunity to obtain an account according to an embodiment of the present invention by solicitation through mail, telephone, email, or any other advertisement technique such as billboard, television ad, or print ad. For telephonic signup, an entity may be solicited by telephone, or the entity may initiate the contact him or herself by dialing a telephone number that has been provided by any of the above-referenced advertisement techniques, for example. For mail signup, the entity may fill out a form and return it in a pre-paid envelope. The entity may obtain such a form, by way of non-limiting example, via its inclusion with a bill or other communication associated with a pre-existing account. For internet-based signup, the entity may visit a webpage and fill out a form. A link to such a webpage may appear on any content website or may be included in an emailed solicitation.

Once the entity (or other party) has submitted an application, the issuing bank determines whether it will accept 120 the application. Acceptance involves conventional risk-determination techniques, such as checking the applicant's credit. Further, the issuing bank may check its own records for the applicant should the applicant already be a customer of the issuing bank. Part of the determination typically involves screening the applicant according to normal screening procedures associated with any financial products that form part of the account. For example, for an embodiment of the present invention that includes a credit card, the acceptance process would typically include a screening of applicants similar or identical to a screening of applicants that would precede issuing such a credit card that is not associated with an embodiment of the present invention. For an embodiment of the present invention that includes a savings account only, the process will typically include the screening that an applicant would undergo upon application for a standard savings account. In sum, the financial product or products associated with an embodiment of the present invention typically define, in part, the screening process that an applicant will undergo. As discussed further below, such an initial screening process may be independent from a secondary screening process that is associated with requesting trigger events and their corresponding benefits.

Once the application is accepted, the customer may select trigger events and associated benefits 130. Note that in certain embodiments of the present invention, the accountholder may choose trigger events and associated benefits contemporaneously with his or her application submission 110. Trigger events generally initiate payment protection in accordance with certain embodiments of the present invention. Such events include, by way of non-limiting example, involuntary loss of employment, divorce, bankruptcy, disability, death judicial proceedings, tax events, natural disasters, and hospitalization. The accountholder may select trigger events from a list of possibilities that are displayed to the accountholder via, by way of non-limiting example, the interne, email, traditional mail, or telephone. Alternately, or in addition, the customer may define a trigger event him or herself. The customer may select any number of trigger events.

Benefits available according to certain embodiments of the present invention include deferring mandatory payments (e.g., monthly minimum payments) for a certain amount of time and without incurring interest, and/or extending one or more lines of credit (which may be done automatically by, e.g., via wire transfer to an account, adding credit to a credit card, or by adding to or distributing a stored value card). The type of protection invoked upon a trigger event may depend on the particular type of trigger event itself. Benefits may survive death of the accountholder.

Other types of benefits include one or more lines of credit. Such lines of credit may be limited to certain merchants by, for example, making the money available on the card associated with the account and limiting the card for use with particular merchants via a merchant code. Alternately, or in addition, certain embodiments of the invention may extend a generic line of credit, such that a trigger event causes a line of credit of a particular amount to be extended for any use whatsoever. In either the limited or generic case, a line of credit may be automatically entered onto the balance of a card associated with the account such as a credit or stored value card. Lines of credit extended as benefits according to certain embodiments of the present inventions may be drawn upon to retire up to a certain number of full or partial periodic payment obligations and/or full or partial debt balances.

A benefit may include a line of credit specifically targeted to paying obligations associated with a financial product that does not form part of the universal payment protection account. That is, an accountholder may possess a financial instrument, such as a credit card, that is not part of an account associated with an embodiment of the present invention. Such a financial product is referred to herein as an "outside financial product." Such an outside financial product may have a payment obligation associated with it, such as a minimum monthly payment for a credit card. A benefit according to an embodiment of the present invention may include a line of credit that is specifically configured to pay obligations associated with outside financial products. In the example of a outside financial product credit card, a benefit may be a line of credit that covers the minimum monthly payments. Such a line of credit may be restricted for payment of that credit card only.

Note that embodiments of the present invention may be used to protect payment obligations for any of a variety of outside financial products such as, by way of non-limiting example, mortgages, loans such as car loans, savings accounts such as 401k accounts, and credit cards. Such line of credit benefits may be unrestricted, or may be restricted for use against any financial obligation including financial obligations associated with any financial product, whether an outside financial product or not.

Note also that payment protection of an outside financial product survives transfer of that outside financial product to another entity. For example, if an outside mortgage is protected, protection will survive the mortgage holder selling the mortgage to another entity. This is unlike e.g., prior art mortgage protection services where the mortgage protection is provided by the same entity that holds the mortgage.

Each trigger event is generally associated with at least one benefit. Likewise, each benefit is generally associated with at least one trigger event. As an example of a trigger event and benefit pair, certain embodiment of the present invention may include payment holidays. For example, embodiments of the present invention may offer the entity a set of certain predetermined days on which the entity may declare that a trigger event has occurred. A set of such predetermined days may typically, but not necessarily, include federal holidays. Thus, for example, once the entity selects such a set of days as part of selecting trigger events (e.g., at step 130), that entity may use any of the selected days (e.g., Veteran's Day) to declare that a trigger event has occurred. The entity may further select (e.g., at step 130) and eventually receive a benefit associated with such a trigger event. Such a benefit may include any of the benefits discussed herein. Alternately, or in addition, the entity may select a reprieve from an obligation for a limited time (e.g., a payment holiday). Such a reprieve may constitute an interest-free line of credit that automatically extends to the obligation that the entity has selected to be the recipient of the payment holiday.

Typically, the issuing bank calculates a value for each trigger event and associated benefit pair. Such a value is the result of an actuarial analysis of the trigger event, benefit, and accountholder information. The value may be calculated using standard actuarial charts, such as those prepared by or associated with the Society of Actuaries or the Social Security Administration, known to those of skill in the art. Such values generally represent an expected value of the trigger event and benefit pair. Once the issuing bank arrives at a value, it may price the associated payment protection.

Payment protection pricing may be determined as an actuarially-determined expected value plus an additional charge. The additional charge may include consideration of, by way of non-limiting example, administrative costs, marketing costs, competitive analysis, etc. Payment schemes that take into account both an actuarial value and an additional charge include, by way of non-limiting example, a flat monthly fee, a lump-sum fee, a percentage of a monthly obligation (e.g., a percentage of a monthly mortgage payment), a percentage of a total outstanding debt (e.g., a percentage of an entire mortgage), a percentage of an average monthly balance, or any combination of the preceding. Once a total fee is determined using actuarial analysis and other considerations 140, it is included 150 in a bill to the accountholder.

Figure 2:
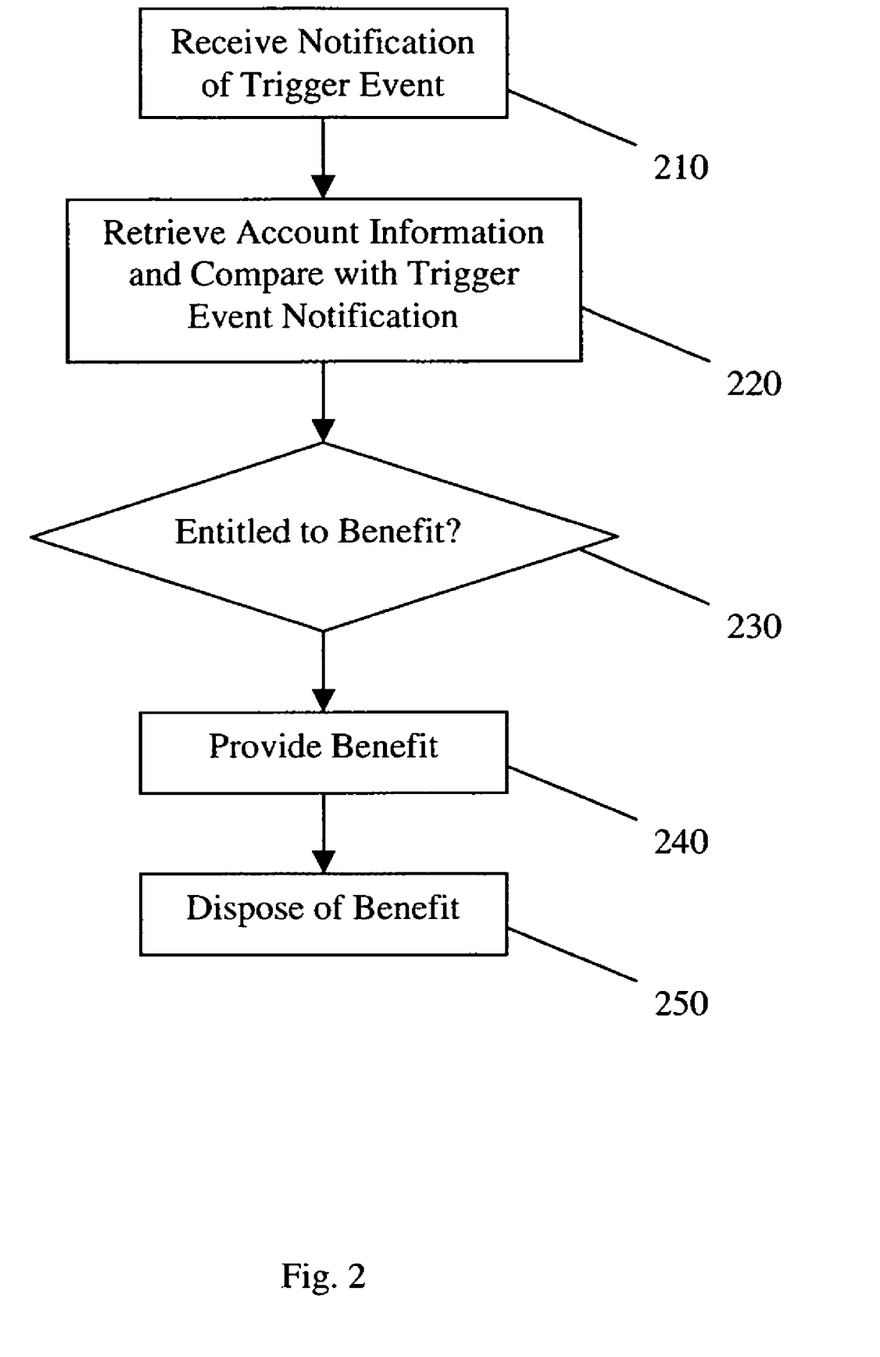
FIG. 2 is a flowchart illustrating benefit claiming according to an embodiment of the present invention.

FIG. 2 is a flowchart illustrating benefit claiming according to an embodiment of the present invention. Payment protection is typically invoked by the accountholder notifying 210 the issuing bank of a trigger event. Notification may occur by way of telephone, letter, email, or interne, such as via a webpage-based form. Trigger event notification may occur automatically, without the accountholder's participation. By way of non-limiting example, the issuing bank may receive notification of a death by monitoring coroner's reports or by other means. Once the issuing bank receives notification of a trigger event, it proceeds to retrieve 220 account information associated with the relevant accountholder. The issuing bank will generally retrieve information that reflects each trigger event and benefit pair for which the accountholder has subscribed.

The issuing bank then compares 230 the reported trigger event with those subscribed to by the accountholder and decides whether the accountholder is entitled to one or more benefits. The decision process may further involve inquiries of the accountholder or other parties. By way of non-limiting example, in the event of hospitalization, the accountholder, hospital, or insurer, for example, may be required to produce evidence of hospitalization to the issuing bank. Evidence may take the form of a receipt, insurance report, police report, or other indicia of hospitalization. Evidence may be conveyed automatically, without the participation of the accountholder. In the hospitalization example, the issuing bank may gather receipts, insurance reports, or police reports directly from, respectively, the hospital, the insurer, or the police, without the involvement of the accountholder. In general, additional evidence required by the issuing bank may include, by way of non-limiting example, receipts, official reports, death certificates, court records or orders, police records, sworn statements, verified statements, other statements, telephonic verification with the accountholder or a third party, emailed verification with the accountholder or a third party, and written verification by the accountholder or a third party. Once the issuing bank decides that the accountholder is entitled to one or more benefits, it will provide 240 the same to the accountholder.

The accountholder or other benefit recipient may receive the benefit automatically. Exemplary techniques for such automatic transfer include, by way of non-limiting example, check, direct deposit, or wire transfer to the accountholder or directly to the party to whom the obligation is due, or by addition to or distribution of a stored value card. Automatic transfer may include activation of a stored value card, e.g., using the techniques taught in U.S. Pat. No. 6,615,190 to Slater entitled "Sponsor-Funded Stored Value Card."

At step 250, the benefit is optionally disposed of. That is, certain embodiments of the present invention cancel or suspend without interest the debt incurred by accepting a benefit. The disposition of a debt arising from a benefit may be predetermined based on the terms and conditions of the debt protection agreement options selected and actively in place. That is, selecting a disposal option may occur as part of selecting benefits and trigger events. In certain embodiments, a line of credit specifically configured for payment of obligations associated with an outside financial product serves to effectively defer payment of those obligations until such time that repayment of the line of credit is due. However, certain embodiments may dispose of the benefit by entirely forgiving debt arising from the line of credit. In such embodiments, the disposal of the benefit may serve to effectively cancel outside financial product payment obligation altogether.

Figure 3:
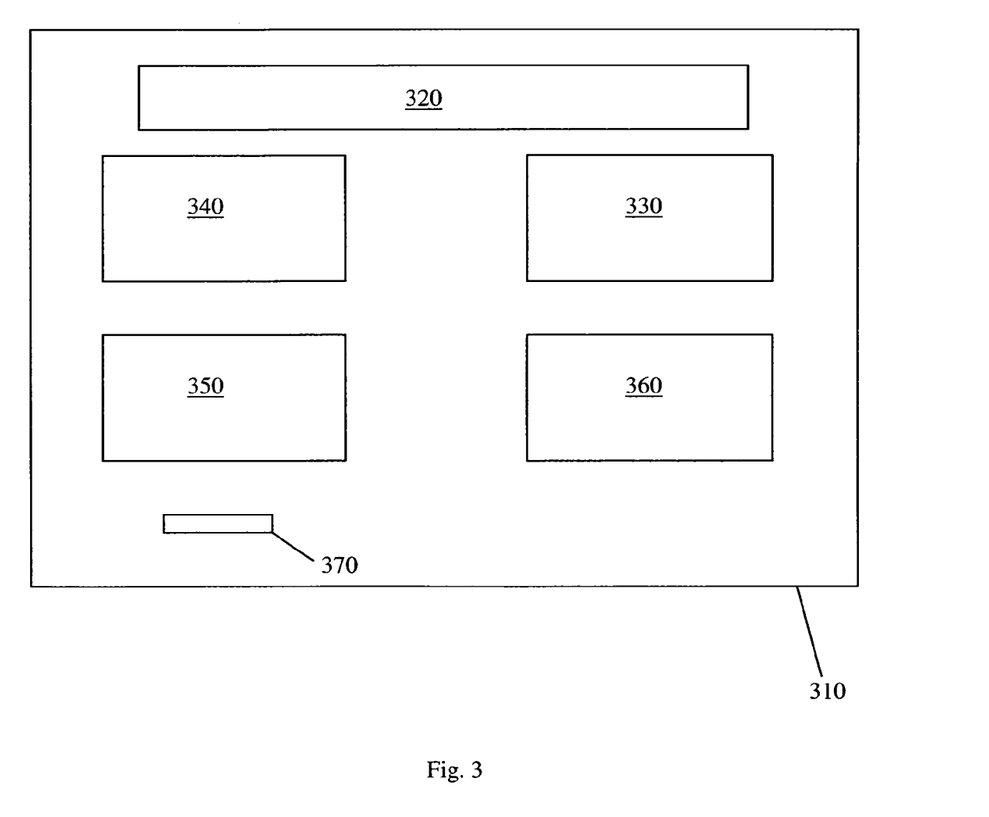
FIG. 3 is a schematic diagram illustrating a web page according to an embodiment of the present invention.

FIG. 3 is a schematic diagram illustrating a web page 310 according to an embodiment of the present invention. Such a web page may include a heading 320, which identifies the issuing bank or the payment protection program. The web page may require an accountholder to log in at portion 360 with a username and password. The web page may be used to select a trigger event from a list of trigger events 330 and a benefit from a list of benefits 340. The benefits list may dynamically change in response to selecting a trigger event. For example, if an accountholder selects "hospitalization" as a trigger event, the corresponding list of benefits 340 may alter to reflect only those benefits that are relevant upon hospitalization.

The accountholder may use the web page to select the length of time that deferment will last should the accountholder select a deferment benefit. The length of time may be an absolute length of time, e.g., measured in days, a relative length of time, e.g., until the accountholder resumes employment, or a combination of both, e.g., the longer of when the accountholder resumes employment or 100 days. The user may select a length of time from a list or may be able to enter a length of time into a field particularly designed for such a feature. Note that selection of a length of time is not limited to selection via a website; an accountholder may perform such selection telephonically, by way of regular mail, or through any other communication technique.

Embodiments of the present invention may calculate payment options in response to the accountholder's request. That is, when an accountholder selects a trigger event and benefit pair, the issuing bank typically performs an actuarial computation and calculates an associated fee (140 of FIG. 1). The issuing bank may display the fee to the accountholder in real-time on the webpage of FIG. 3 and give the accountholder an opportunity to withdraw or confirm his or her selection. The accountholder may be given an opportunity to modify the selection. For example, if the accountholder selects a deferment benefit of 100 days and decides that the calculated fee is more than the accountholder is willing to pay, the website may give the accountholder the opportunity to select a deferment period with a fewer number of days. Note that presentation of a fee is not limited to presentation via a website. The issuing bank may calculate and convey the fee amount to an accountholder telephonically, by way of regular mail, or through any other communication technique.

The account holder may specify a maximum monthly fee, and the issuing bank may calculate coverage options (trigger events and associated benefits) that are available for that amount. The issuing bank may store a list of the accountholder's payment obligations of which it is aware, and draw from such a list in response to the accountholder's request. For example, the accountholder may specify that he or she is willing to pay $5 per month for some type of payment protection. The issuing bank may determine all trigger event and benefit pairs that are available to that accountholder for such a fee. Alternately, or in addition, the accountholder may narrow the field of trigger events and/or benefits that are subject to this feature. For example, the accountholder may be interested in all deferments that are available for $5 per month on any of a variety of payment obligations. The issuing bank may then offer the accountholder a choice of payment obligations that it may defer for a fee of $5 per month. Note that presentation of trigger events and/or benefits is not limited to presentation via a website. The issuing bank may convey such options to an accountholder telephonically, by way of regular mail, or through any other communication technique.

The accountholder may specify on the website a hierarchy of debts to be paid in order upon certain trigger events. That is, where the accountholder selects debt cancellation as a benefit, he or she may further specify which debts should be cancelled in order. Specifying the order of debt cancellation may be accomplished via the web page or any other communication channel, such as telephone, mail, or email.

The accountholder may designate individuals that are to receive funds via stored value cards or other techniques upon certain trigger events. More generally, certain embodiments of the present invention allow persons other than the accountholder to receive benefits. Such persons may be specified on the web page during account signup (e.g., 130 of FIG. 1), or at any other time. Further, specifying benefit recipients may be accomplished via telephone, email, regular mail, or any other communications channel.

The web page may include a trigger event reporting feature 350. Such a feature may include a list of trigger events that the accountholder has selected and been approved for. The accountholder may use the reporting feature to report trigger events to the issuing bank. By way of non-limiting example, the reporting feature may allow the accountholder to click on a particular trigger event, which will cause a separate dialog screen to appear in which the accountholder may present details of the trigger event. As discussed above in reference to FIG. 2, the issuing bank will then take steps to process the accountholder's information and convey an associated benefit to the accountholder if appropriate.

The web page may be used to check on the status of any outstanding trigger events. By way of non-limiting example, the web page may include a list of trigger events about which the accountholder has notified the issuing bank. The accountholder may click on a listed pending trigger event, by way of non-limiting example, in order to receive information about the issuing bank's processing status of the trigger event. Such information may include an identification of additional information required by the issuing bank. It may further include an estimated time remaining until the accountholder receives the associated benefit.

Certain embodiments of the present invention may incorporate trigger events that are activated by an individual other than the accountholder. By way of non-limiting example, one such trigger event my be an accountholder's spouse involuntarily losing his or her job. As another example, hospitalization of an accountholder's child may trigger cancellation of debt associated with the accountholder. As yet another example, the accountholder may be a minor, who may receive a line of credit restricted for use against a college savings plan in response to the divorce of a parent accountholder. In this latter example, the debt arising from the line of credit may be cancelled in disposing of the benefit. In general, a benefit may protect payment obligations of the accountholder, the person associated with the trigger event, or a third party.

Note that embodiments of the present invention do not provide insurance in the traditional sense, in that they do not pay claims. Instead, certain embodiments of the present invention extend lines of credit. Repayment on these lines of credit may be canceled or deferred.

Advantages of certain embodiments of the present invention include the following. One advantage is a removal of the need for a separate consolidation contract (and signature, in the event of activation) for each separate debt or obligation. Another advantage is that the issuing bank becomes associated with many of the accountholder's obligations. Yet another advantage is that the debt protection liability does not transfer to an owner or investor in the accountholder's obligation because it does not attach to the accountholder's obligation instrument as an amendment. Therefore no prior approval or additional agreements must be made with an owner of or investor in the accountholder's obligation.

The terminology used herein is for the purpose of describing particular embodiments only, and is not intended to limit the scope of the present invention. Unless defined otherwise, all technical, financial and scientific terms used herein have the same meanings as commonly understood by one of ordinary skill in the art to which this invention belongs. As used throughout this disclosure, the singular forms "a," "an," and "the" include plural reference unless the context clearly dictates otherwise.

I claim:

1. A computer implemented method of relieving an entity from at least one future payment obligation, the computer implemented method comprising:
   receiving, at a web page, information relating to the entity;
   deciding whether to issue an account to the entity;
   issuing an account to the entity in response to the step of deciding, wherein the entity uses the account for purchases from third parties;
   receiving data provided by the entity at a web page, the data being associated with at least one of the entity and the account, the data comprising: first information reflecting a trigger circumstance, the first information defining a potential future situation, and second information reflecting a line of credit intended to address at least one payment obligation; wherein the payment obligation is not initially associated with the account and not in existence at a time of issuance of the account, and wherein the payment obligation is owed to a third party;
   processing, using a programmed computer, at least a portion of the data using at least one actuarial computation, the actuarial computation reflecting an expected value of the line of credit;
   receiving from the entity at least one payment associated with the trigger circumstance and the line of credit, the at least one payment providing the entity with the ability to receive the line of credit upon occurrence of the trigger circumstance, the at least one payment comprising the expected value of the line of credit and at least one additional fee;
   receiving an indication that a trigger circumstance has occurred;
   comparing information in the indication to account information associated with the entity;
   determining, based on the account information associated with the entity and consistent with the data received from the entity, that the entity is entitled to the line of credit; and
   providing the line of credit to the entity in accordance with the account information associated with the entity.

2. The method of claim 1 wherein the line of credit is intended to address any payment obligation.

3. The method of claim 1 further comprising restricting use of the line of credit.

4. The method of claim 3 wherein the restricting comprises restricting who receives funds from the line of credit.

5. The method of claim 1 wherein the line of credit is intended for use against a financial obligation arising from a financial product.

6. The method of claim 1 wherein the trigger event is selected from the group consisting of: loss of employment, divorce, disability, hospitalization, medical treatment, family leave, natural disaster, judicial proceeding, tax event, call to duty, fire, flood, marriage, child birth, child adoption, retirement, and death.

7. The method of claim 1 wherein the at least one payment obligation is selected from the group consisting of: loan payment, insurance bill, rent, utility bill, hospital bill, mortgage payment, credit card bill, retirement savings, car payment, penalty, fine, attorney fee, tax, lease, line of credit, letter of credit payment, and child support.

8. The method of claim 1 wherein the account comprises at least one financial product selected from the group consisting of: a credit card, a benefit card, a stored value card, a letter of credit, and a line of credit.

9. The method of claim 1 further comprising:
   receiving data selected by the entity, the data being associated with the account, the data comprising: third information reflecting a second trigger circumstance, the third information defining a potential future situation, and fourth information reflecting a second line of credit, the second line of credit being intended to address at least one payment obligation;
   receiving a request, the request indicating that a trigger circumstance has occurred;
   comparing information in the request to account information associated with the entity;
   determining, based on the account information associated with the entity and consistent with the data received from the entity, that the entity is entitled to a triggered benefit, the triggered benefit being selected from the group consisting of: the line of credit and the second line of credit; and
   providing the triggered benefit to the entity in accordance with the account information associated with the entity.

10. A system for relieving an entity from at least one future payment obligation, the system comprising:
    a computer configured to receive information relating to the entity;
    an account associated with the entity, wherein the account is usable by the entity to make purchases from third parties;
    a web page configured to receive data selected by the entity, the data being associated with the account, the data comprising: first information reflecting a trigger circumstance, the first information defining a potential future situation, and second information reflecting a line of credit being intended to address at least one payment obligation, wherein the payment obligation is not initially associated with the account and not in existence at a time of issuance of the account, and wherein the payment obligation is owed to a third party;
    a computer configured to process at least a portion of the data using at least one actuarial computation, the actuarial computation reflecting an expected value of the line of credit;
    means for receiving from the entity at least one payment associated with the trigger circumstance and the line of credit, the at least one payment providing the entity with the ability to receive the line of credit upon occurrence of the trigger circumstance, the at least one payment comprising the expected value of the line of credit and at least one additional fee;
a web page configured to receive a request, the request indicating that a trigger circumstance has occurred;
a computer configured to compare information in the request to account information associated with the entity;
a computer configured to determine, based on the account information associated with the entity and consistent with the data received from the entity, that the entity is entitled to the line of credit; and
means for providing the line of credit to the entity in accordance with the account information associated with the entity.

11. The system of claim 10 wherein the line of credit is intended to address any payment obligation.

12. The system of claim 10 wherein use of the line of credit is restricted.

13. The system of claim 12 wherein the restricting comprises restricting who fray receives funds from the line of credit.

14. The system of claim 10 wherein the line of credit is intended for use against a financial obligation arising from a financial product.

15. The system of claim 10 wherein the trigger event is selected from the group consisting of: loss of employment, divorce, disability, hospitalization, medical treatment, family leave, judicial proceeding, tax event, natural disaster, call to duty, fire, flood, marriage, child birth, child adoption, retirement, and death.

16. The system of claim 10 wherein the at least one payment obligation is selected from the group consisting of: loan payment, insurance bill, rent, utility bill, hospital bill, mortgage payment, credit card bill, retirement savings, car payment, penalty, fine, attorney fee, tax, lease, line of credit, letter of credit payment, and child support.

17. The system of claim 10 further comprising at least one financial product selected from the group consisting of: a credit card, a benefit card, a stored value card, a letter of credit, and a line of credit, wherein the account comprises the at least one financial product.

18. The system of claim 10 further comprising:
a computer configured to receive data selected by the entity, the data being associated with the account, the data comprising: third information reflecting a second trigger circumstance, the third information defining a potential future situation, and fourth information reflecting a second line of credit, the second line of credit being intended to address at least one payment obligation;
a web page configured to receive a request, the request indicating that a trigger circumstance has occurred;
a computer configured to compare information in the request to account information associated with the entity;
a computer configured to determine, based on the account information associated with the entity and consistent with the data received from the entity, that the entity is entitled to a triggered benefit, the triggered benefit being selected from the group consisting of: the line of credit and the second line of credit; and
means for providing the triggered benefit to the entity in accordance with the account information associated with the entity.

19. The system of claim 10, further comprising:
means for receiving an application from the entity, the application comprising information relating to the entity; and
means for accepting the application.

20. A system for of relieving an entity from at least one future payment obligation, the system comprising:
means for receiving an application from the entity;
means for accepting the application;
means for issuing an account to the entity in response to said accepting, wherein the entity uses the account for purchases from third parties;
means for receiving data selected by the entity, the data being associated with the account, the data comprising: first information reflecting a trigger circumstance, the first information defining a potential future situation, and second information reflecting a line of credit, the line of credit being intended to address at least one payment obligation, wherein the at least one payment obligation is not initially associated with the account and wherein the payment obligation is owed to a third party;
means for processing at least a portion of the data using at least one actuarial computation, the actuarial computation reflecting an expected value of the line of credit;
means for receiving from the entity at least one fee associated with the trigger circumstance and the line of credit, the at least one fee providing the entity with the ability to receive the line of credit upon occurrence of the trigger circumstance, the at least one fee comprising the expected value of the line of credit and at least one additional fee;
means for receiving a request, the request indicating that a trigger circumstance has occurred;
means for comparing information in the request to account information associated with the entity;
means for determining, based on the account information associated with the entity and consistent with the data received from the entity that the entity is entitled to the line of credit; and
means for providing the line of credit to the entity in accordance with the account information associated with the entity.

21. A computer implemented method of relieving an entity from at least one future payment obligation, the computer implemented method comprising:
receiving, at a web page, information relating to the entity;
deciding whether to issue an account to the entity;
issuing an account to the entity in response to the step of deciding, wherein the entity uses the account for purchases from third parties;
receiving data provided by the entity at a web page, the data being associated with at least one of the entity and the account, the data comprising: first information reflecting a trigger circumstance, the first information defining a potential future situation, and second information reflecting a line of credit intended to address at least one payment obligation, wherein the payment obligation is not initially associated with the account and wherein the payment obligation is owed to a third party, and wherein the trigger circumstance is selected from the group consisting of: loss of employment, divorce, disability, hospitalization, medical treatment, family leave, natural disaster, judicial proceeding, tax event, call to duty, fire, flood, marriage, child birth, child adoption, retirement, and death;

processing, using a programmed computer, at least a portion of the data using at least one actuarial computation, the actuarial computation reflecting an expected value of the line of credit;

receiving from the entity at least one payment associated with the trigger circumstance and the line of credit, the at least one payment providing the entity with the ability to receive the line of credit upon occurrence of the trigger circumstance, the at least one payment comprising the expected value of the line of credit and at least one additional fee;

receiving an indication that a trigger circumstance has occurred;

comparing information in the indication to account information associated with the entity;

determining, based on the account information associated with the entity and consistent with the data received from the entity, that the entity is entitled to the line of credit; and providing the line of credit to the entity in accordance with the account information associated with the entity.

* * * * *